United States Patent
Baruch

[11] Patent Number: 5,818,221
[45] Date of Patent: *Oct. 6, 1998

[54] FIBEROPTIC VELOCITY TRANSDUCER INCLUDING DIELECTRIC COATING FOR FILTERING AND VELOCITY DETERMINATION

[75] Inventor: Ezra Baruch, Pasadena, Calif.

[73] Assignee: Hydro-Aire Division of Crane Company, Burbank, Calif.

[*] Notice: The term of this patent shall not extend beyond the expiration date of Pat. No. 5,617,022.

[21] Appl. No.: 821,790

[22] Filed: Mar. 21, 1997

Related U.S. Application Data

[63] Continuation of Ser. No. 431,905, May 1, 1995, Pat. No. 5,617,022.

[51] Int. Cl.⁶ .............................. G01P 3/36; G01D 5/34
[52] U.S. Cl. ..................... 324/175; 250/231.13
[58] Field of Search .............. 324/175, 207.13, 324/96, 244.1; 250/231.13, 231.18, 231.17, 227.14, 227.17, 227.21

[56] References Cited

U.S. PATENT DOCUMENTS

| | | | |
|---|---|---|---|
| 3,324,393 | 6/1967 | Casey et al. | 324/96 |
| 3,466,541 | 9/1969 | Bernard et al. | 324/96 |
| 3,502,978 | 3/1970 | Bernard et al. | 324/96 |
| 3,625,617 | 12/1971 | Chen | 356/118 |
| 3,738,756 | 6/1973 | Chaney | 356/117 |
| 3,743,929 | 7/1973 | Lesueur | 324/96 |
| 4,091,280 | 5/1978 | Ellis et al. | 250/231 R |
| 4,539,521 | 9/1985 | Matsumoto | 324/244 |
| 4,560,867 | 12/1985 | Papuchon et al. | 250/225 |
| 4,563,639 | 1/1986 | Langeac | 324/96 |
| 4,564,754 | 1/1986 | Sato et al. | 250/225 |
| 4,698,497 | 10/1987 | Miller et al. | 250/231 R |
| 4,767,164 | 8/1988 | Yeung | 303/91 |
| 4,843,232 | 6/1989 | Emo et al. | 250/225 |
| 4,947,035 | 8/1990 | Zook et al. | 250/225 |
| 5,051,578 | 9/1991 | Slemon et al. | 250/227.23 |
| 5,153,512 | 10/1992 | Glasheen | 324/175 |
| 5,204,619 | 4/1993 | Beigbeder et al. | 324/174 |
| 5,399,853 | 3/1995 | Maurice | 250/227.17 |
| 5,412,469 | 5/1995 | Spillman, Jr. | 356/328 |
| 5,617,022 | 4/1997 | Baruch | 324/175 |

FOREIGN PATENT DOCUMENTS

| | | |
|---|---|---|
| A-0568992 | 10/1993 | European Pat. Off. |
| WO-A-8906364 | 7/1989 | WIPO |

OTHER PUBLICATIONS

European Search Report—Appln. No. EP 96 30 3026—Dated 11 Jul. 1996—Examiner: Nessman, C.
Patent Abstract Appln.# JP840232888 Dated May 11, 1984.
Patent Abstract Appln.# JP810173598 Dated Oct. 28, 1981.

*Primary Examiner*—Walter E. Snow
*Attorney, Agent, or Firm*—Fulwider Patton Lee & Utecht, LLP

[57] ABSTRACT

A fiberoptic velocity transducer for use in determining the rotational speed of an object and comprising a magneto-optic material coated with a dielectric material that operates to selectively pass light energy having a first range of wavelengths, and to reflect light energy having a second range of wavelengths, so as to make the light energy with the second range of wavelengths available as a reference signal, the magneto-optic material functioning to cause a Faraday rotation in the light energy having the first range of wavelengths that is characteristic of the speed of the rotating object.

18 Claims, 2 Drawing Sheets

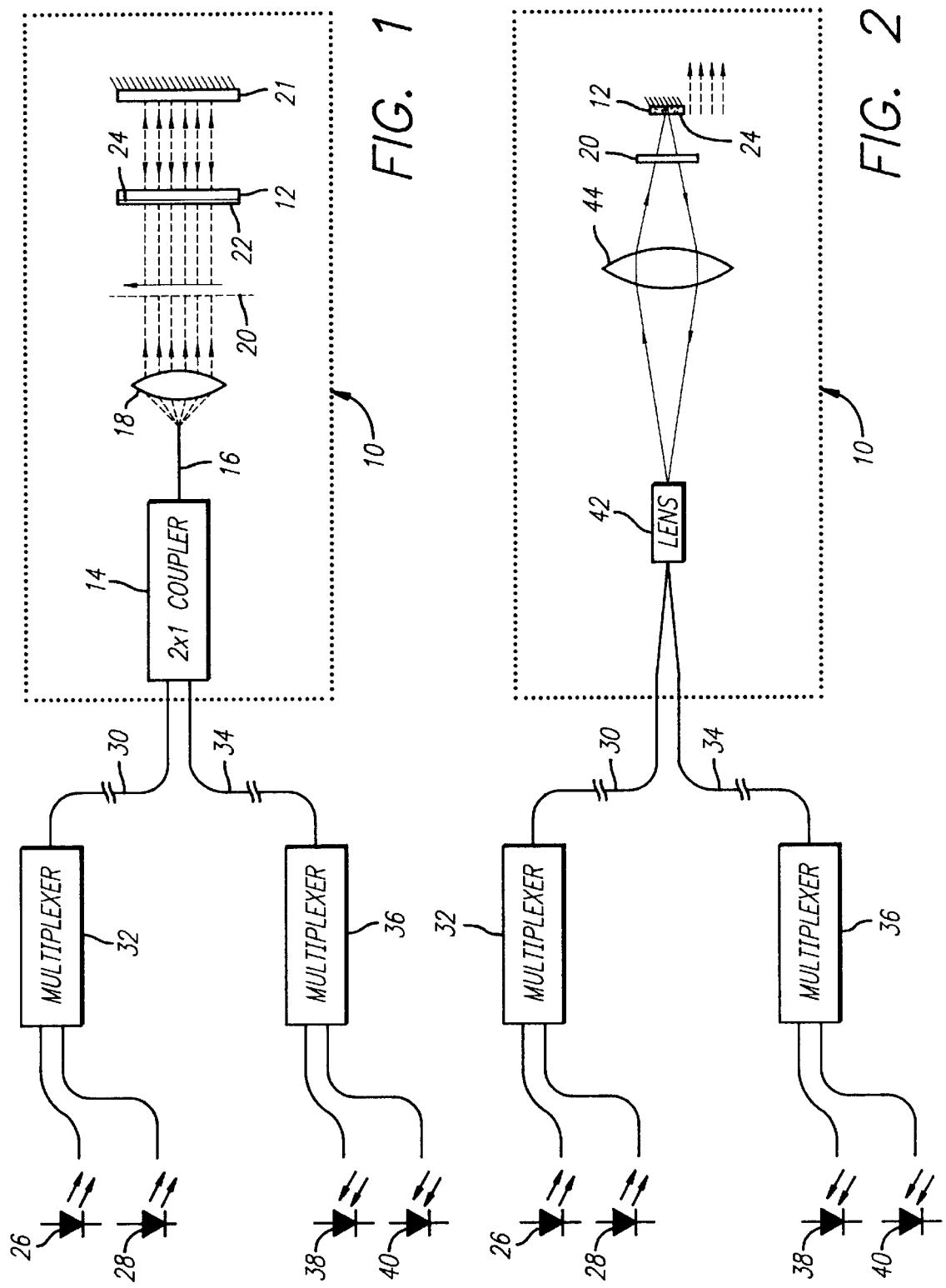

FIBEROPTIC VELOCITY TRANSDUCER INCLUDING DIELECTRIC COATING FOR FILTERING AND VELOCITY DETERMINATION

This is a continuation of application Ser. No. 08/431,905, filed May 1, 1995, now U.S. Pat. No. 5,617,022.

BACKGROUND OF THE INVENTION

1. Field of the Invention

The invention relates to transducers for use in determining the velocity of an object and, more particularly, to a fiberoptic velocity transducer utilized in the measurement of rotational speed of an aircraft breaking system component.

2. Description of the Related Art

Since the incorporation of rotating members into machinery, there has been a need to observe and control the velocity of the member in order to meet system efficiency and responding requirements. Such requirements have become increasingly stringent for high performance vehicular systems, particularly those connected with braking system of aircraft and other high speed vehicles. For such systems, it is critical to know the rate at which the rotational speed of the wheels is decreasing in response to application of the braking system.

One means utilized in the past to determine the rotational speed of an object is a form of electromechanic tachometer. The electromechanic tachometers typically functioned to generate signals proportional to the speed of the rotating members but were limited by, among other things, electronic noise existing in the environment in which they were used. While some improvements to the early electromechanic tachometers were helpful in reducing the signal noise and improving the resolution of the tachometer, the electromechanic instruments still left much to be desired as a primary instrument for measuring velocity of a braking system component such as the brake disk or wheel.

Later developments in rotational speed sensors included the use of light pulse signals, where the number of pulses observed by an electronic control unit correlated to the speed of the disk. Due to their EMI insensitivity, light weight and high resolution systems utilizing light to determine rotational speed were particularly desirable. These systems, however, had a nonhermetically sealed optical cavity which can be detrimental in applications (such as aircraft wheel-speed sensing) that are required to go through significant pressure changes in a dirty environment.

Further improvements included velocity transducers utilizing magneto-optic material configured to cooperate with fiberoptic light energy which were incorporated into systems for determining rotational speed. Such systems not only embodied improved means for transmitting light pulses to electronic controllers, but were able to take advantage of Faraday rotation properties of the magneto-optic material to hermetically seal the optical cavity. Generally speaking, when subjected to a magnetic field, a particular magnetic flux density is created in the magneto-optic material which functions to cause polarized light passing through the material to undergo a Faraday rotation. Coupling then occurs between the electric field vectors of photons comprising the polarized light energy passing through the magneto-optic material and electric field vectors of the magnetically aligned atoms of the magneto-optic material. When such coupling occurs, the polarization vectors of the light energy are rotated, with the amount of Faraday rotation being determined by the magnetic flux density of the magneto-optic material. By configuring a rotating member with means to affect the magnetic flux density of the magneto-optic material to varying degrees based upon its speed and by noting the relationship between the resulting amount of rotation of the polarization vectors and the speed of the member, it was possible to determine the speed of the rotating member by monitoring the resulting polarization vectors. In this configuration, the light is modulated by the varying magnetic flux, and since an encoder disc is not necessary, the optical cavity that contains elements through which the light propagates can be hermetically sealed.

In conventional applications of the velocity transducers employing magneto-optic material, the magneto-optic material is used to facilitate the development of light energy signals used to determine the speed of a rotating member. The magneto-optic material was carefully chosen so that it caused only a narrow bandwidth of wavelengths of polarized light to rotate. Accordingly, a single light source with a broad spectrum of wavelengths was conventionally -propagated through the magneto-optic material, the magneto-optic material functioning to rotate the light energy having a particular range of wavelengths within the bandwidth and leave unaffected the light energy with wavelengths outside the bandwidth. In this way, the unaffected light energy was used as a reference in the calculation of rotational speed, or as a reference for an integrity check, and the rotated light energy as an indication of rotational speed. In the alternative, two light sources were simultaneously utilized and propagated through the magneto-optic material, one having a wavelength outside the bandwidth, and thus utilized as a reference, and the other being rotated by the magneto-optic material and used as an indicator of rotational speed. In either case, the conventional velocity transducer typically comprised a mirror operating to reflect the light waves, irrespective of their wavelengths, backed through the magneto-optic material.

These conventional velocity transducers incorporating magneto-optic material were limited, however, since they required relatively expensive parts and materials. The magneto-optic material was expensive since, in order to facilitate the development of a light energy reference, it was required to effect only a narrow bandwidth of wavelengths of light. In addition, the light source light detectors and optical fibers were expensive since the light wavelength which is not affected by the magneto-optic material is normally a longer wavelength than the ones used for standard communication fiber-optic components.

To circumvent or overcome the problems and limitations associated with prior art velocity transducers, a velocity transducer comprised of relatively inexpensive parts and materials and that generates signals which accurately correspond to the rotational speed of a member is highly desirable. The present invention fulfills this need.

SUMMARY OF THE INVENTION

The invention provides a fiberoptic velocity transducer functioning to transmit signals characteristic of the velocity of a rotating object. To accomplish the transmission of such signals, the present invention incorporates novel structure cooperating with magneto-optic material possessing optical Faraday rotation properties.

The invention may be applied to a variety of problems requiring the accurate measurement of rotational velocity, but has been found to be particularly beneficial to high performance braking systems such as those on aircraft or other high velocity vehicles.

The fiberoptic velocity transducer of the present invention operates to condition a plurality of light energy sources so that they may be utilized in determination of the speed of a rotating object. More specifically, the present invention includes means for selectively passing a first range of wavelengths of light energy through a magneto-optic material, thereby causing a Faraday rotation in the passed light energy that is characteristic of the speed of an object being monitored, and for selectively reflecting a second range of wavelength of light energy so as to make the reflected light energy available as a reference.

In one presently preferred embodiment of the present invention, the fiberoptic velocity transducer embodies a 2×1 coupler cooperating with an input/output fiber, each of which operates to emit as well as receive light energy. In addition, the fiberoptic velocity transducer comprises a lens, a polarizer and a mirror as well as a magneto-optic material having a dielectric coating affixed to a proximal side, the dielectric coating functioning to selectively pass certain wavelengths of light.

In operation, light energy having a first wavelength passes through the dielectric coating of the magneto-optic material, whereas the dielectric coating reflects light energy having a second wavelength back to a signal processing system. Not until after passing through the magneto-optic material is the first wavelength light reflected back to the signal processing system by a mirror. Thus, the magneto-optic material causes a Faraday rotation, in the first wavelength light, but does not do so to the second wavelength light. In this way, the first wavelength light may be used as an indicator of the velocity of the object, and the second wavelength light may be used as a reference.

In addition, since the fiberoptic transducer functions to pass only the first wavelength light, less expensive parts and materials, that is, standard off the shelf items may be used in the transducer of the present invention. That is, less expensive magneto-optic material and mirrors may be utilized in the fiberoptic transducer of the present invention, since they are only required to cooperate with the first wavelength of light. The magneto-optic material the and mirror need not be configured to cooperate with the second wavelength of light.

In another preferred embodiment of the present invention, the transducer lacks the 2×1 coupler and further includes a GRIN (graded index) lens which is configured to collimate the light energy and an imaging lens for imaging the calibrated light on the magneto-optic material. In yet another preferred embodiment, the transducer lacks structure for collimating light energy entirely, yet contemplates the use of a sensitive detection circuit therewith.

Other features and advantages of the present invention will become apparent from the following detailed description, taken in conjunction with the accompanying drawings, which illustrate, by way of example, the principals of the invention.

BRIEF DESCRIPTION OF THE DRAWINGS

FIG. 1 is a schematic representation of the preferred embodiment of the present invention, illustrating a fiberoptic velocity transducer.

FIG. 2 is another embodiment of the fiberoptic velocity transducer depicted in FIG. 1.

DETAILED DESCRIPTION OF THE PREFERRED EMBODIMENT

Figure 3:
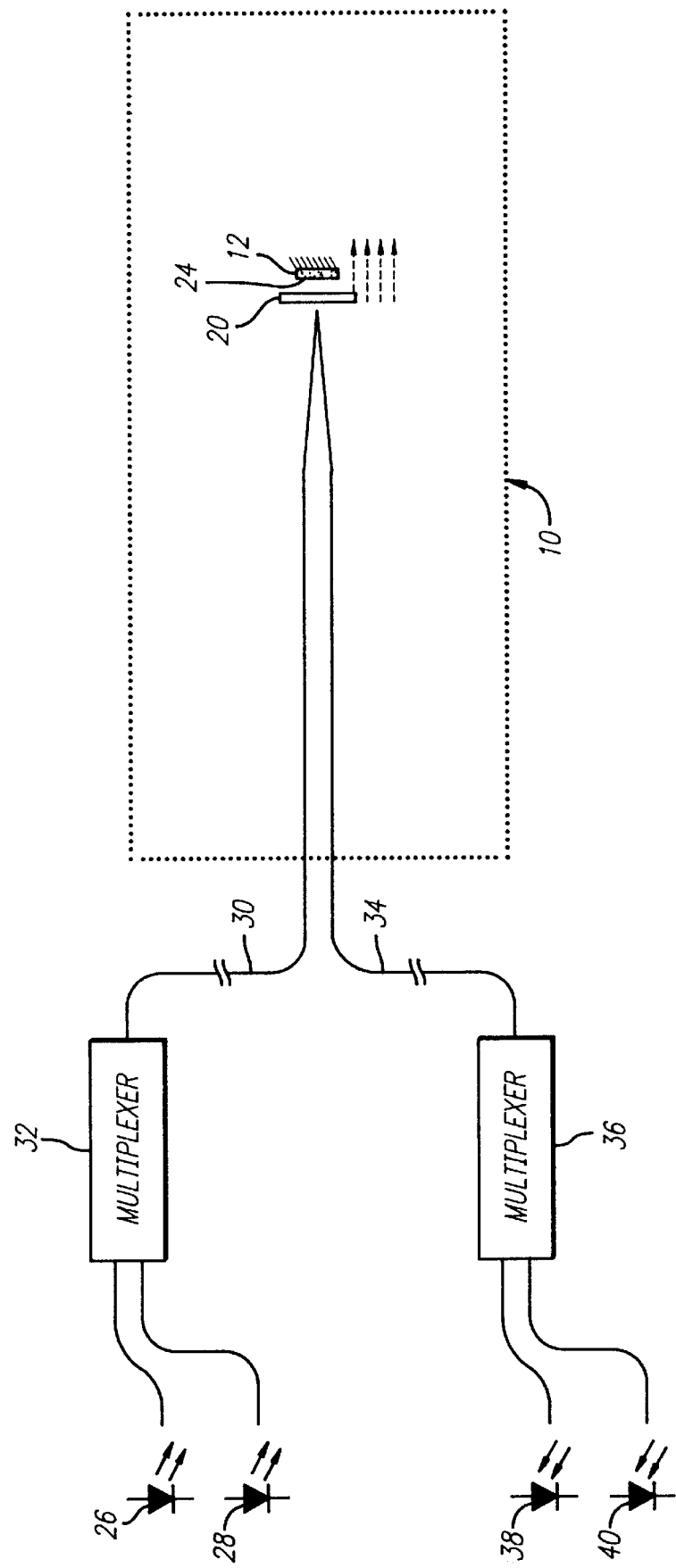
FIG. 3 is yet another embodiment of the fiberoptic velocity transducer depicted in FIG. 1.

As is shown in the drawings, which are included for purposes of illustration and not by way of limitation, the invention is embodied in a fiberoptic velocity transducer for use in determining the rotational speed of an object. Conventional means to determine the rotational velocity of an object has been found to either be limited in resolution or accuracy, be EMI sensitive, or comprise complex structure and systems that are expensive to manufacture. In particular, velocity transducers found in the art which employ magneto-optic material, have been constrained to use magneto-optic material that passes narrow bandwidths of light energy and fiber-optic components which are required to cooperate with light energy having non-standard wavelengths. The fiberoptic velocity transducer of the present invention is highly accurate and has optimum resolution and, comprises relatively inexpensive parts and materials. Thus, the present invention provides a superior means for determining the rotational speed of an object.

The present invention (FIG. 1) provides a fiberoptic velocity transducer 10 functioning to transmit signals characteristic of the velocity of a rotating object. To accomplish the transmission of such signals, the present invention incorporates novel structure cooperating with magneto-optic material 12 that possesses optical Faraday rotation properties.

In particular, it is contemplated in one presently preferred embodiment that the fiberoptics transducer 10 embody a 2×1 coupler 14 cooperating with an input/output fiber 16, each of which operate to emit as well as receive light energy. In addition, the fiberoptic transducer 10 comprises a lens 18, a polarizer 20, and a mirror 21. Further, the magneto-optic material 12 has a dielectric coating 22 affixed to a proximal side 24 which operates to selectively pass certain wavelengths of light.

In the preferred embodiment, the fiberoptic velocity transducer 10 receives light energy from two sources 26, 28, each having a different known wavelength. The light energy having the first wavelength 26 may be utilized to generate a signal characteristic of the velocity of a particular object, whereas the light energy having the second wavelength 28 may be utilized to generate a reference signal. It is further contemplated that each of the light sources are combined into a single exciting fiberoptic line 30 by a first wave division multiplexer 32 and that the exciting fiberoptic line 30 propagates the light energy to the fiberoptic velocity transducer 10.

At the fiberoptics velocity transducer 10, the light energy propagated by the exciting fiberoptics line 30 is coupled through the 2×1 coupler 14 into the input/output fiber 16. The light energy emitting from the input/output fiber 16 is then collimated by the lens 18 and thereafter, polarized by the polarizer 20. The light energy next encounters the magneto-optic material 12, the dielectric coating 22 of which functions to selectively pass the light energy having the first wavelength 26, and reflects the light energy having the second wavelength 28.

The linearly polarized light energy that passes through the dielectric coating 22, and is rotated by the magneto-optic material 12 to an extent corresponding to the magnetic flux density flowing through the material. It is contemplated that the object being measured be adapted with an excitor ring or similar mechanisms so that a cycling magnetic field, parallel to the direction of light propagation through the magneto-optic material 12, is created by the object which, in turn, produces a cycling magnetic flux density within the magneto-optic material 12. In this way, the magnetic field created by the moving object affects the magneto-optic material 12 to a degree which corresponds speed of the object. Moreover, the degree to which the magneto-optic material 12 is affected by the object determines the extent to which the polarized light is rotated.

After the light energy having the first wavelength 26 is rotated by the magneto-optic material 12, it propagates to the mirror 21 which reflects the light back through the magneto-optic material 12. The magneto-optic material 12 again rotates the polarized light to an extent corresponding to the magnetic flux density flowing through the material. The first wavelength light energy 26 is then propagated back through the polarizer and is consequently attenuated, the amount of which is characteristic of the extent of rotation or angular position of the light energy caused by the magneto-optic material 12 and more importantly, the resulting signal can be directly related to the velocity of the object. The attenuated light is then focused by the lens 18 back into the input/output fiber 16, through the coupler 14 and to a detecting fiberoptic line 34. Thereafter, the attenuated light energy passes through a second wave division multiplexer 36 and is propagated to a first wavelength photodetector 38 which operates to measure the strength of the light energy signal.

The polarized light that is reflected back by the dielectric material 22 of the magneto-optic material 12 passes unattenuated through the polarizer 20 and through the lens 18 and back into the coupler 14. From the coupler 14, the unattenuated light energy is propagated through the detecting fiberoptic line 34 to the second wave division multiplexer 36 and to a second photodetector 40 which operates to measure the strength of the unattenuated light. Finally, a signal processing unit compares the attenuated and unattenuated light energy signals, each of which having known original energies and known and different original wavelengths. Upon comparison of these signals, the velocity of the rotating object may be determined.

In a second presently preferred embodiment of the present invention (FIG. 2), the fiberoptic velocity transducer includes a GRIN (graded index) lens 42 which cooperates with an imaging lens 44 to image collimated light energy through the polarizer 20 and upon the proximal side 24 of the magneto-optic material 12. In this embodiment, the exciting and detecting lines 30, 34 are held together and positioned at the center of the GRIN lens 42, so that its center line passes exactly between the two fibers. Using this scheme, the light energy emitted from the exciting fibers 30 is collimated by the GRIN lens 42 which in turn propagates the light energy at a certain angle relative to its own axis depending upon the optical parameters of the GRIN lens 42 and the radial position of the exciting fiber 30 to the lens axis.

In this second preferred embodiment, once the light energy is imaged upon the magneto-optic material 12, the operation of the transducer is similar to that of the first embodiment. In this design, however, first and second wavelengths 26, 28 of light energy must have magnitudes preferably not more than 100 nm apart. Therefore, in this embodiment, it is possible to use a single broad spectrum LED that would generate light energy at both first and second wavelengths 26, 28 rather than two distinct light sources.

In a third presently preferred embodiment (FIG. 3), the magneto-optic transducer lacks means for collimating light energy. Instead, the light energy is directly propagated through the polarizer 20 and upon the opto-magnetic material 12. Significantly, this embodiment does not include fragile optical components needing alignment which, therefore, significantly reduces the cost of the magneto-optic transducer 10. Further, since this preferred embodiment is designed for manipulating low levels of light energy, it is contemplated that this embodiment be used in conjunction with a particularly sensitive detection circuit.

From the foregoing, it will be appreciated that the fiberoptic velocity transducer of the invention provides an accurate and inexpensive means for determining the rotational velocity of an object. Thus, the present invention provides a superior means for determining rotational speed.

While a particular form of the invention has been illustrated and described, it will also be apparent that various modifications can be made without departing from the spirit and scope of the invention. Thus, it should be understood that various changes in form, detail, and application of the present invention may be made without departing from the spirit and scope of this invention.

I claim:

1. A fiberoptic velocity transducer comprising:
    a plurality of polarized light propagators for propagating polarized light energy having a plurality of light energy wavelengths;
    magneto-optical material for causing a Faraday rotation in a first pre-determined range of wavelengths of said light energy;
    a dielectric filter for selectively passing the first pre-determined range of wavelengths of the polarized light energy from said propagating means through said magneto-optical material and for selectively reflecting a second pre-determined range of wavelengths of the polarized light energy to prevent the second pre-determined range of wavelengths of light from passing through said magneto-optical material; and
    a reflector for reflecting the light energy passing through said magneto-optical material.

2. The fiberoptic velocity transducer of claim 1, wherein said plurality of polarized light propagators comprises a fiberoptic line.

3. The fiberoptic velocity transducer of claim 1, further comprising means for collimating light energy.

4. The fiberoptic velocity transducer of claim 3, wherein said collimating means is a lens.

5. The fiberoptic velocity transducer of claim 3, wherein said collimating means is a GRIN lens.

6. The fiberoptic velocity transducer of claim 2, further comprising means for coupling said plurality of light energy wavelengths.

7. The fiberoptic velocity transducer of claim 6, wherein said coupling means is a 2×1 coupler.

8. The fiberoptic velocity transducer of claim 1, wherein said plurality of polarized light propagators comprises a plurality of input/output fibers.

9. The fiberoptic velocity transducer of claim 1, wherein said dielectric filter comprises a dielectric coating affixed to said magneto-optical material.

10. The fiberoptic velocity transducer of claim 1, wherein said magneto-optical material is adapted to cause a Faraday rotation in said first pre-determined range of wavelengths of light energy.

11. The fiberoptic velocity transducer of claim 1, wherein said reflector is a mirror.

12. The fiberoptic velocity transducer of claim 1, wherein said reflector is a reflective coating.

13. The fiberoptic velocity transducer of claim 1, wherein said reflector is adapted to reflect said first pre-determined range of wavelengths of light energy.

14. The fiberoptic velocity transducer of claim 2, wherein said light energy is reflected back through a path to said plurality of light sources.

15. A fiberoptic velocity transducer comprising:

a coupler for coupling a plurality of polarized light energy wavelengths;

a magneto-optic material that causes a Faraday rotation in polarized light energy;

a dielectric coating affixed to said magneto-optic material, said dielectric coating operating to selectively pass a first pre-determined range of wavelengths of polarized light energy through said magneto-optic material and to selectively reflect a second pre-determined range of wavelengths of polarized light energy away from said magneto-optic material;

and a reflector for reflecting polarized light energy passing through said magneto-optic material.

16. The fiberoptic velocity transducer of claim 15, wherein said coupler is a 2×1 coupler.

17. The fiberoptic velocity transducer of claim 15, further comprising means for collimating light energy.

18. The fiberoptic velocity transducer of claim 17, wherein said reflector is a mirror and said collimating means is a lens.

* * * * *